United States Patent [19]

Kieffer

[11] Patent Number: 5,345,986
[45] Date of Patent: Sep. 13, 1994

[54] AUXILIARY ROUTER GUIDE

[76] Inventor: Vincent C. Kieffer, 3205 Augusta Ave., Omaha, Nebr. 68144

[21] Appl. No.: 163,688

[22] Filed: Dec. 9, 1993

[51] Int. Cl.⁵ .................. B27M 3/00; B27C 5/00; G01B 3/14
[52] U.S. Cl. .................. 144/372; 33/430; 33/562; 144/144 R; 144/371; 409/130
[58] Field of Search ......... 144/144 R, 144.5, 144.5 G, 144/371, 372; 33/427, 429, 430, 477, 562, 574; 409/125, 130

[56] References Cited

U.S. PATENT DOCUMENTS

| | | | |
|---|---|---|---|
| 1,615,213 | 1/1927 | Carter | 144/144.5 R |
| 3,910,327 | 10/1975 | Heckenlaible | 144/144 R |
| 4,062,123 | 12/1977 | Lundquist | 144/144.5 R |
| 4,102,374 | 7/1978 | Klein | 144/144.5 R |
| 4,230,164 | 10/1980 | Mericle | 33/562 |
| 4,294,297 | 10/1981 | Kieffer | 144/134 D |
| 5,603,717 | 8/1986 | Thomas | 33/562 |

*Primary Examiner*—W. Donald Bray
*Attorney, Agent, or Firm*—John A. Beehner

[57] ABSTRACT

An apparatus and method for use with a router guide plate adapted to be secured to the underside of the router, the router guide plate including guide pins, the apparatus including a base platform having top and bottom surfaces, and a guide pin receiving channel mounted on the top surface of the base platform, the channel adapted to receive and guide the guide pins on the router guide plates. Stop blocks are mounted on the base platform adjacent the channel for preventing advance of the router guide plate beyond a predetermined point and an alignment bar is adjustably and removably mounted on the bottom surface of the base platform, the alignment bar being operative to align a piece of wood to be routed relative to the guide pin receiving channel. The method includes steps of providing the above described apparatus and positioning the base platform adjacent the work face of a work piece such that the bottom surface of the base platform is at least partially overlying the outer surface of the work place. The alignment bar is then adjusted and the guide pins are inserted into the guide pin receiving channel. The router bit is moved into working engagement with the work piece and a routed line is then cut by maintaining the guide pins in the guide pin receiving channel while simultaneous advancing the guide pins along the guide pin receiving channel.

18 Claims, 6 Drawing Sheets

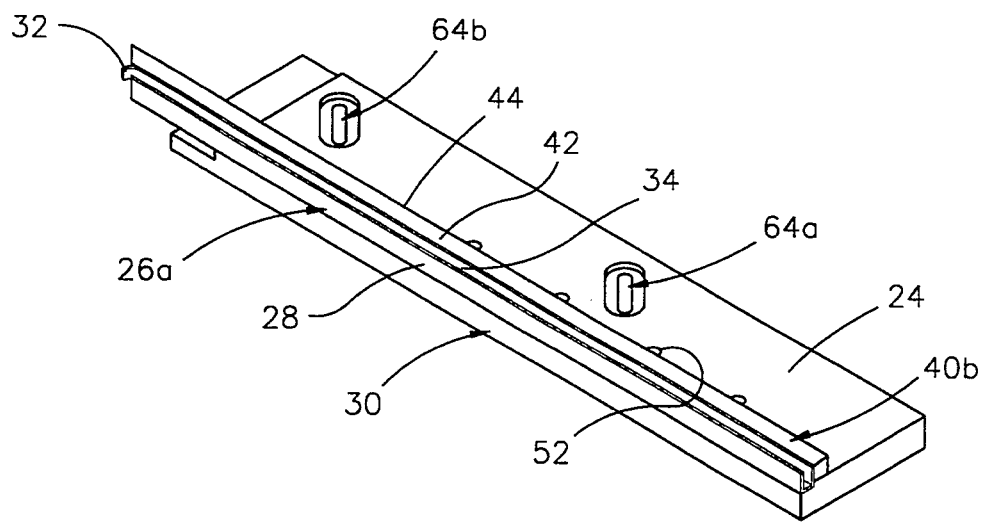
FIG. 5
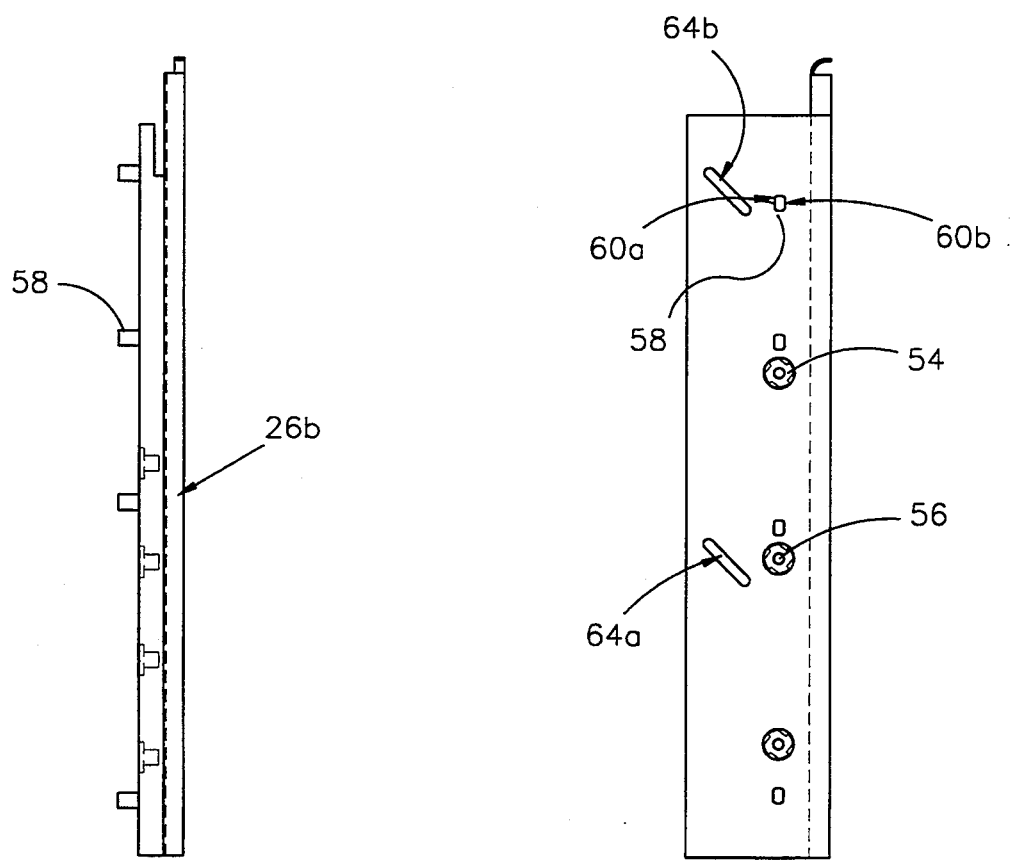
FIG. 6
FIG. 7

AUXILIARY ROUTER GUIDE

BACKGROUND OF THE INVENTION

1. Technical Field

The present invention relates generally to an auxiliary router guide for use with a router guide plate mounted on a router and, more particularly, to an auxiliary router guide having a base platform on which a guide pin receiving channel is mounted, the channel adapted to receive the guide pins of a router guide plate, the auxiliary router guide also including stop blocks for preventing advance of the router guide plate and an alignment device for aligning a work piece to be routed relative to the guide receiving channel. This invention is the subject of Disclosure Document No. 302,478, received in the Patent and Trademark Office on Feb. 24, 1992.

2. Description of the Prior Art

The router is a valuable tool for finish carpentry because it is able to cut or scribe lines and patterns into the face of a work piece. However, the fact that in this application a router works on the face of a work piece, as opposed to one edge thereof raises the problem of how to guide the router along the work piece to cut the desired pattern. This has generally been solved in the past by the use of templates clamped either to the work piece or adjacent the work piece. However, making such templates involves very intricate work and such templates can be prohibitively expensive for the woodworker to obtain. Furthermore, damage to a template can result in the template being completely unusable. Such a template must be replaced, resulting in additional expense for the router operator. Additionally, a different sized template must be used to adjust the size of the design being inscribed on the work piece if a larger or smaller design is desired. Another disadvantage of the use of templates is that a different template must be supplied for each curve or design to be cut into the work piece. This can severely restrict the creativity of a nonprofessional woodworker. Therefore, there is a need for a guide apparatus which will allow woodworkers of varying skill to produce quality work.

One of the more promising router guides is disclosed in Kieffer, U.S. Pat. No. 4,294,297, which discloses a router guide apparatus adapted to be mounted on the underside of a router, the apparatus including at least two guide pins removably mounted on the guide plate and extending downwards therefrom and a tool opening, the tool opening positioned for protrusion of the router bit through the center of the guide plate. In use, the guide pins are positioned to engage the edge of a work piece. As the guide pins are moved around the corner of the work piece, a design is cut into the upper surface of the work piece depending upon the positioning of the guide pins relative to the router bit.

While the above-described invention certainly addresses some of the problems involved in producing quality craftsmanship, there remains several major problems not surmounted by the above-described invention. When the Kieffer router plate is used on a work piece having slightly uneven edges, the design being cut into the work piece likewise will be uneven, and thus not of quality craftsmanship. Also, when the Kieffer router plate is used on a work piece, the guide pins must be kept in constant contact with the edges of the work piece for proper operation of the router plate, which can be difficult due to vibration of the router and right angle corners of the work piece. Finally, the location of the design on the work piece may not be adjusted as it is totally dependent upon the location of the guide pins on the router plate. Therefore, there is a need for an auxiliary router guide which will allow the guide pins of Kieffer, U.S. Pat. No. 4,294,297, to more accurately and easily track around the corner of a work piece, while providing for adjustment of the location of the design on the workpiece.

Therefore, an object of the present invention is to provide an auxiliary router guide for use with a router guide plate.

Another object of the present invention is to provide an auxiliary router guide which includes a guide pin receiving channel adapted to receive and guide the guide pins on a router guide plate.

Another object of the present invention is to provide an auxiliary router guide which may produce designs on a work piece in positions other than the corners of a work piece.

Another object of the present invention is to provide an auxiliary router guide which may be used on a variety of shaped work pieces, including those having slightly uneven edges.

Another object of the present invention is to provide an auxiliary router guide which does not use the edges of the work piece for guiding the router.

Another object of the present invention is to provide an auxiliary router guide which provides for adjustment of the location of the design on the work piece.

Finally, an object of the present invention is to provide an auxiliary router guide for use with a router guide plate which may quickly and easily produce professional quality cuttings and designs through the use of a router on a work piece.

SUMMARY OF THE INVENTION

The auxiliary router guide of the present invention is adapted for use with a router guide plate, the router guide plate secured to the underside of a router having a rotatable bit protruding from the underside thereof. The guide plate includes at least two guide pins removably mounted on the guide plate which extend downwards therefrom, the guide plate further including a tool opening positioned for protrusion of the bit through the center of the tool opening.

The auxiliary router guide itself includes a base platform having top and bottom surfaces and a guide pin receiving channel mounted on the top surface of the base platform, the channel adapted to receive and guide the guide pins on the router guide plate. Stop blocks are mounted on the base platform adjacent the guide pin receiving channel for preventing advance of the router guide plate, and finally an alignment bar is adjustably and removably mounted on the bottom surface of the base platform, the alignment bar operative to align a piece of wood to be routed relative to the guide pin receiving channel.

The invention also contemplates a method for guiding a router having a rotatable bit along a work piece having a work face on the upper surface thereof, the router including a router guide plate mounted on the underside of the router, the router guide plate including a pair of guide pins removably secured to the router guide plate and extending downwards therefrom and a tool opening, the tool opening providing for protrusion of the router bit through the center of the tool opening.

A base platform is provided, the platform having top and bottom surfaces, and a guide pin receiving channel having at least one corner and at least two channel sections, the corner formed between the sections. The guide pin receiving channel is mounted on the top surface of the base platform, the channel being adapted to receive and guide the guide pins on the router guide plate. An alignment bar is mounted on the bottom surface of the base platform for aligning a work piece relative to the guide pin receiving channel.

The base platform is then positioned adjacent the work face of the work piece such that the bottom surface of the base platform is at least partially overlaying the upper surface of the work piece. The alignment bar is then adjusted to position the work piece relative to the guide pin receiving channels such that the work face may be correctly routed.

The guide pins of the router guide plate are then inserted into the guide pin receiving channel and the bit of the router is moved into working engagement with the work face of the work piece. A routed line is then cut into the work face of the work piece by maintaining the guide pins in the guide pin receiving channel while simultaneously advancing the guide pins along the guide pin receiving channel.

The step of guiding the guide pins along the channel further includes advancing the guide pins along a first section of the channel until the first guide pin engages one of the corners. The first guide pin is then advanced along a second section of the channel, the second section being connected to the first section of the channel at the corner, while simultaneously advancing the other guide pin along the first section of the channel to the point of engagement with the corner thereby cutting an arcuate routed line in a work piece. Finally, both guide pins are advanced along the second section of the channel.

There is thus provided a relatively simple and efficient apparatus and method for guiding a router to form arcuate cuts in a work piece. The use of the channel to provide guidance for the guide pins of the router guide plate allows for accurate cuts to be formed in a variety of wood block shapes, including those with slightly uneven edges. Additionally, the location of the design on the work piece may be varied by adjusting the alignment bar to change the position of the work piece. The present invention thus provides a substantial improvement over those router guide devices found in the prior art.

BRIEF DESCRIPTION OF THE DRAWINGS

FIG. 5 is a perspective view of one arm of the auxiliary router guide;

FIG. 6 is a side elevational view of one arm showing the base pegs of the guide;

FIG. 7 is a bottom plan view of one arm showing the pegs having flattened edges formed by machining;

DESCRIPTION OF THE PREFERRED EMBODIMENT

Figure 1:
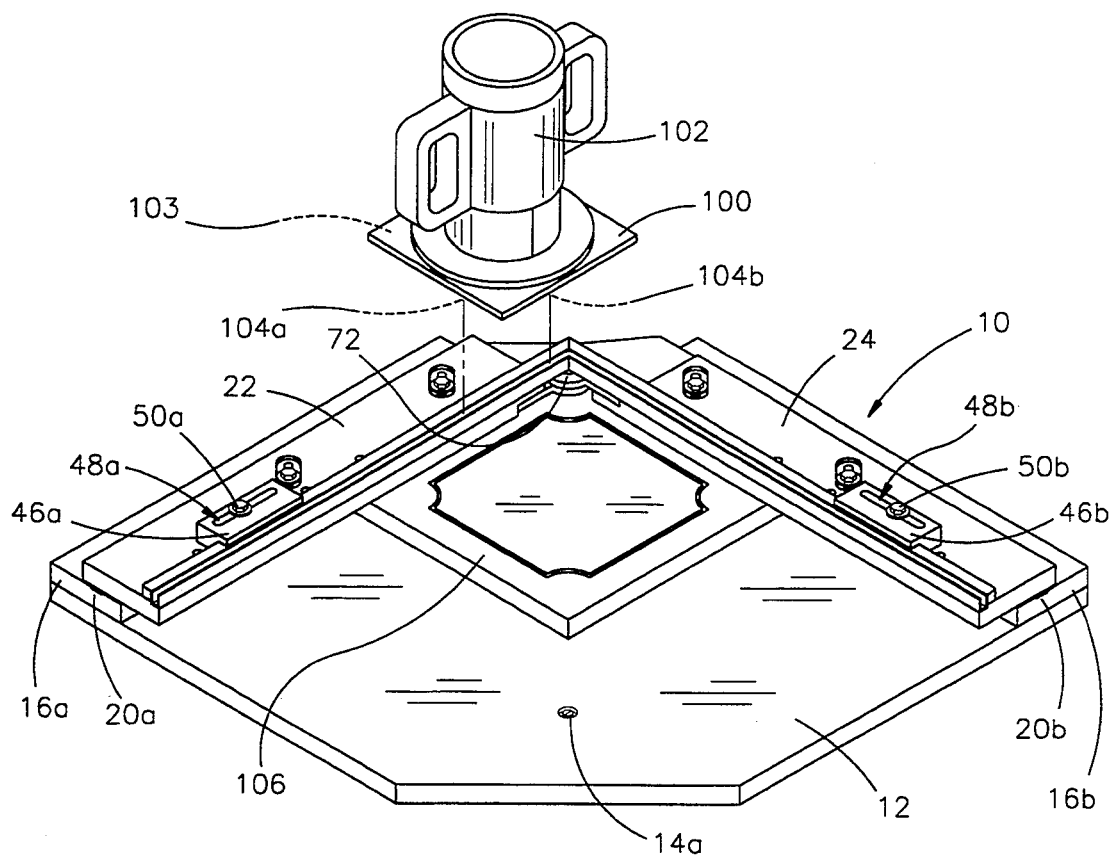
FIG. 1 is a perspective view of the table top mounted auxiliary router guide including the router guide plate and a router mounted to the router guide plate.
Figure 8:
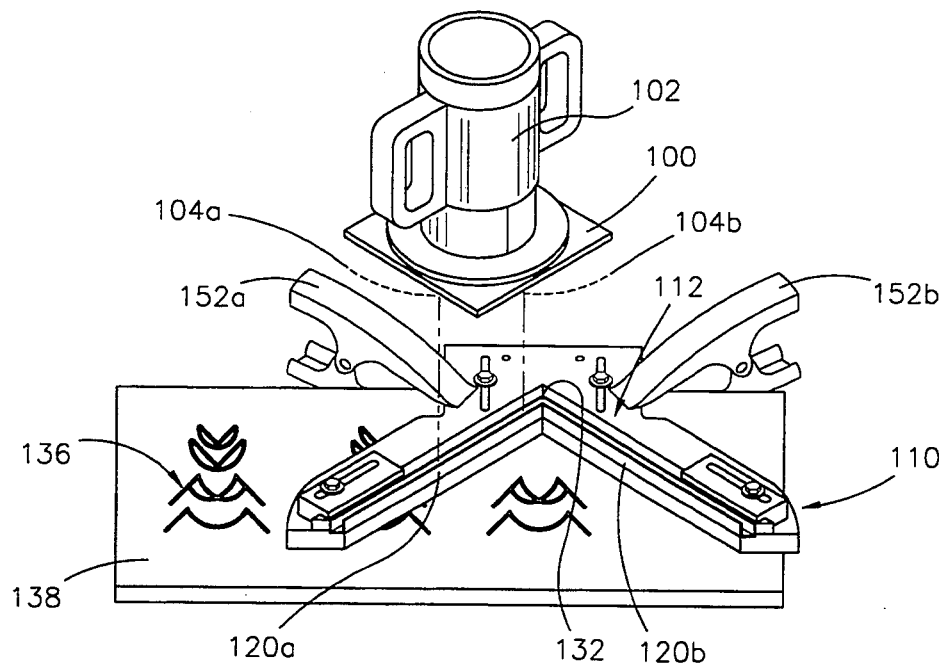
FIG. 8 is a perspective view of the portable auxiliary router guide mounted on a board on which a design is being formed.
Figures 9, 10, 11:
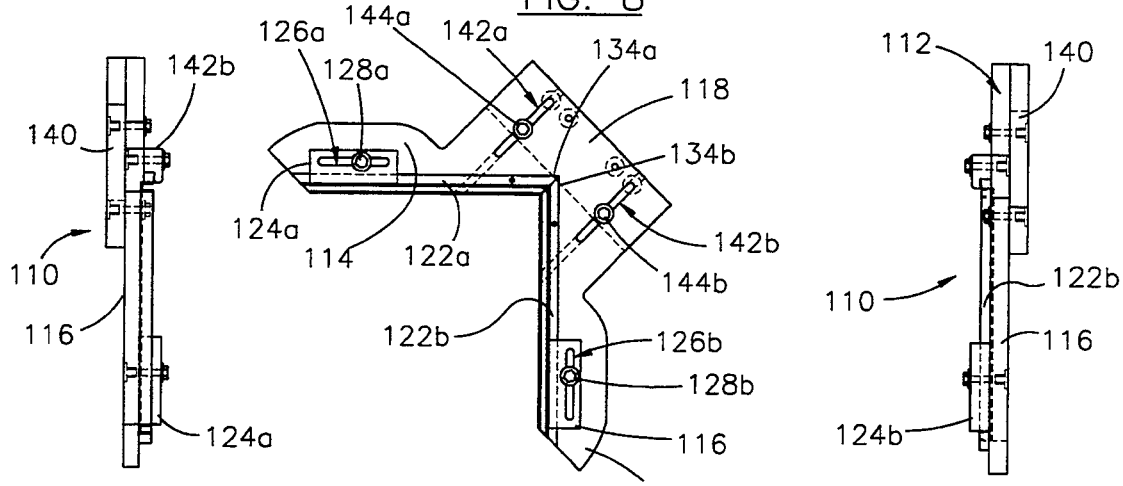
FIG. 9 is a top plan view of the portable auxiliary router guide.
FIG. 10 is a side elevational view of the inside of the portable auxiliary router guide.
FIG. 11 is a side elevational view of the outside of the portable auxiliary router guide.
Figure 13:
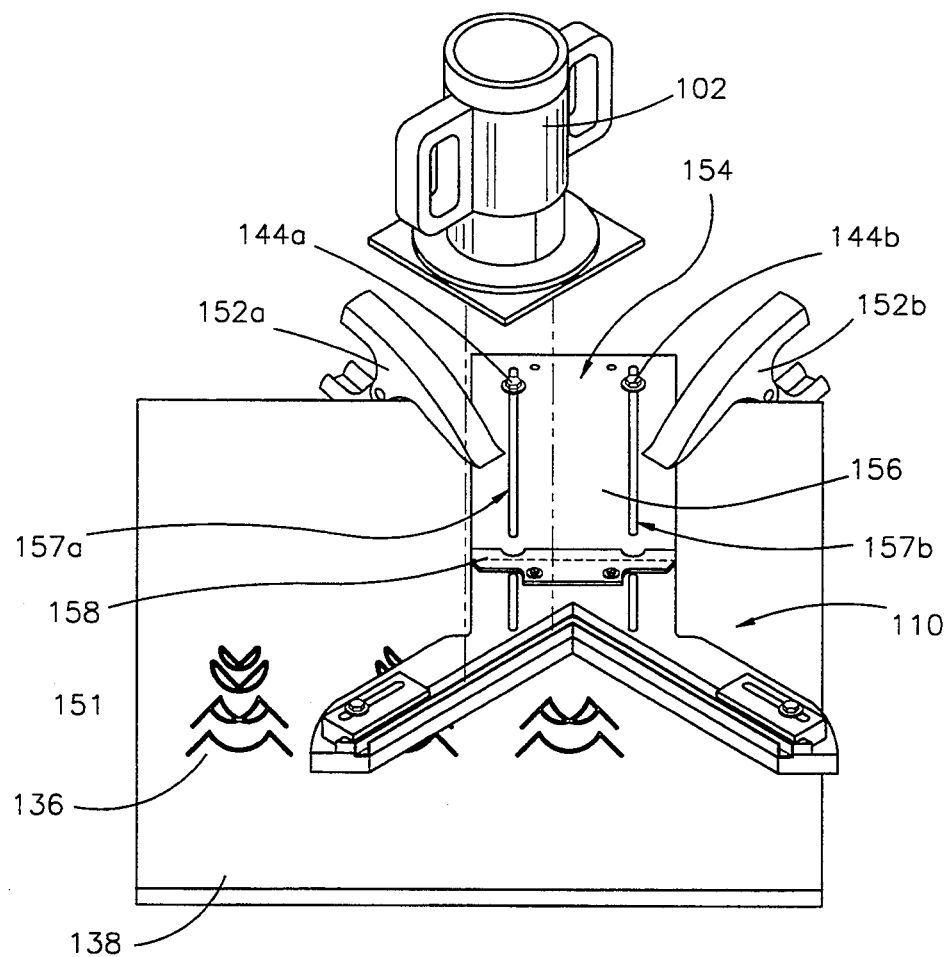
FIG. 13 is a perspective view of the portable auxiliary router guide with the extension mounted thereon.

The auxiliary router guide 10 of the present invention is designed to be used with the router guide plate shown and described in Kieffer, U.S. Pat. No. 4,294,297, which includes a subbase plate 100 having a plurality of guide pin openings 103 for receiving a pair of guide pins 104A and 104B in selected positions. The subbase plate 100, as shown in FIGS. 1, 8 and 13, is substantially similar to the plate shown in FIG. 21, but for purposes of drawing clarity the subbase plate 100 of FIGS. 1, 8 and 13 does not include the guide pin openings 103 or guide pins 104A and 104B, but in a preferred embodiment these elements would be present. Therefore, in this description of the preferred embodiment, reference to the subbase plate 100 of the present invention should be read as referring to the invention embodied in Kieffer, U.S. Pat. No. 4,294,297, although it is to be understood that this invention is not limited to use with the invention of Kieffer.

The auxiliary router guide 10 of the present invention is shown in its preferred embodiment in FIGS. 1–4 as including a generally rectangular base platform 12, which in a preferred embodiment would be constructed of particle board or plywood having a thickness of at least ½". Hold-down screws 14A and 14B may be provided for securing the base platform 12 to a tabletop or the like (not shown).

Mounted on the base platform 12 are a pair of spacing arms 16A and 16B preferably mounted substantially perpendicular to each other and one spacing arm adjacent each rear edge 18A and 18B of the base platform 12. Each of the spacing arms 16A and 16B will preferably consist of longitudinally extended generally flat boards having a generally rectangular cross-section, the board being constructed of any appropriate wood type such as particle board or the like.

Mounted on top of each spacing arm 16A and 16B is a tilt strip 20A and 20B which extends the length of each spacing arm 16A and 16B. The tilt strips 20A and 20B are preferably constructed of ⅜" thick wood having a rectangular cross section, and mounted to extend slightly above each spacing arm 16A and 16B. Each tilt strip 20A and 20B is preferably positioned substantially parallel with the longitudinal axis of the spacing arm 16A and 16B to which it is secured, as shown by the dotted lines in FIG. 2.

Tiltably and adjustably mounted on each of the spacing arms 16A and 16B are guide arms 22 and 24 preferably constructed to have similar dimensions as the spacing arms 16A and 16B. The right guide arm 24 is most clearly shown in FIGS. 5–7 as including a longitudinally extended guide pin receiving channel section 26B having a generally U-shaped cross section. Although the following description refers to the right guide arm 24 for many of the arm elements, it is to be understood that the left guide arm 22 includes similar elements, description of which is only provided where clarification is deemed necessary. The channel section 26B is preferably mounted on the guide arm 24 such that the inner upright wall 28 of the channel section 26B is substantially coplanar with the inner face 30 of the guide arm 24. It is preferred that the channel section 26B be formed of metal such as brushed aluminum metal or the like for increased durability and precision in extruding. FIGS. 5 and 7 show that the channel section 26B include an arcuate section 32 extending rearwards and inwards of the channel section 26B from the outer upright wall 34 of the channel section 26B. This can be seen most clearly in FIG. 5. In a preferred embodiment, the arcuate extension 32 has a height of approximately ½ the height of the outer upright wall 34. This allows arcuate extension 32 to mesh with a similar arcuate extension (not shown) extending from channel section 26A. When channel sections 26A and 26B are positioned generally perpendicular to one another, as shown in FIG. 1, the arcuate extensions cooperate to form a substantially continuous curved outer wall section 36 which connects the channel sections 26A and 26B. In this manner, a substantially continuous channel having an arcuate right angle corner 38 is provided.

It is preferred that the ends of the channel sections 26a and 26b opposite the arcuate right-angle corner 38 be bent inwards, specifically by the inner upright wall 28 and outer upright wall 34 being angled towards one another. This prevents the guide pins 104a and 104b from falling out of the ends of the channel sections 26a and 26b, thus decreasing the chance for mishaps and mistakes.

Mounted adjacent and parallel to the channel section 26B is an angled support strip 40B which is preferably a longitudinally extended board having a generally square cross section, with the top surface 42 of the support strip 40B angled downwards such that the outer edge 44 of the top surface 42 projects higher than the outer upright wall 34 of the channel section 26B. In a preferred embodiment, the angle of the top surface would be between 3° and 15°, however, this dimension is not critical to the invention. The support strips 40A and 40B are operative to slidably support the subbase plate 100, as shown in FIG. 1. The support strips 40A and 40B provide a smooth gliding surface for supporting the subbase plate 100 without marking or scratching the subbase plate 100 and also control the depth of the guide pins 104a and 104b in the channel sections which in turn provides for smooth movement of the guide pins 104a and 104b in the channel sections 26a and 26b.

Figures 2, 3, 4:
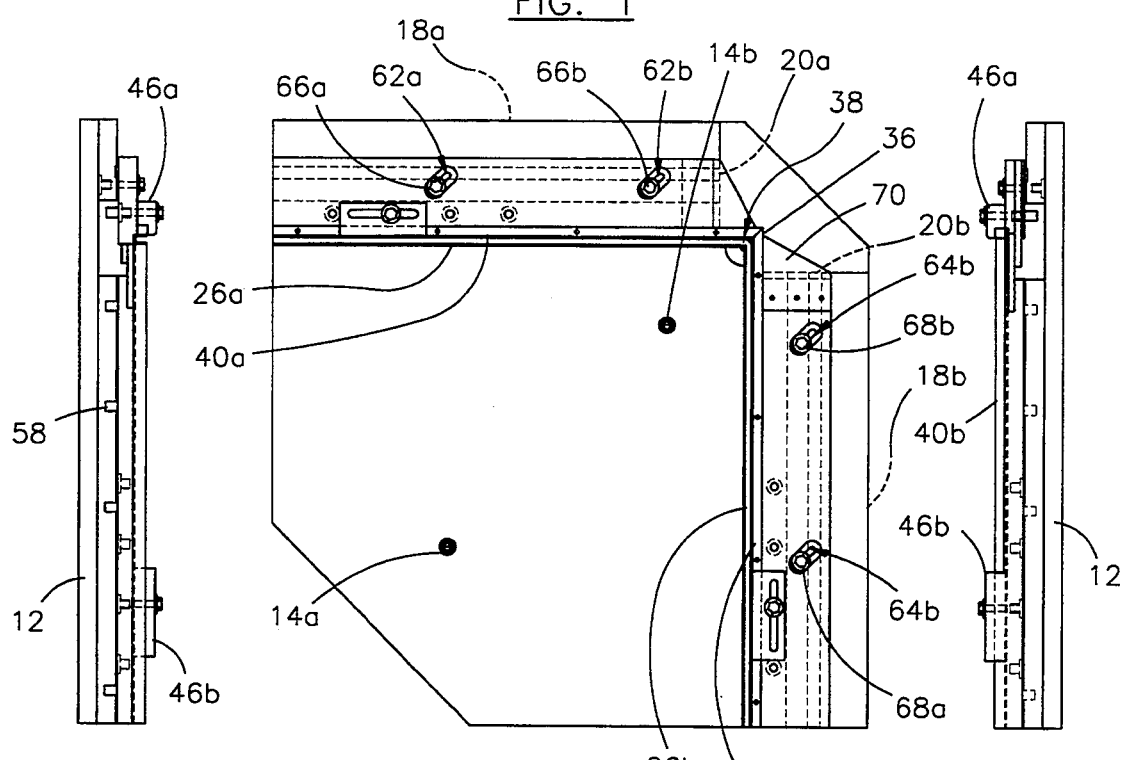
FIG. 2 is a top plan view of the table top mounted auxiliary router guide.
FIG. 3 is a side elevational view of the inside of the auxiliary router guide.
FIG. 4 is a side elevational view of the outside of the table top mounted auxiliary router guide.

Adjustably mounted adjacent each of the angled support strips 40A and 40B is a stop block 46A and 46B each of which partially overlay the respective adjacent support strip 40A and 40B. Each stop block 46A and 46B extends above and over at least the outer edge 44 of the support strip 40A and 40B such that when the router guide plate 100 is moved along the support strip 40A and 40B, it will encounter one of the stop blocks 46A and 46B thus preventing further movement of the router guide plate 100 along the support strip 40A and 40B. As best shown in FIGS. 1 and 2, each stop block 46A and 46B is preferably a block of wood having a generally rectangular cross-section which includes a longitudinally extended slot 48A and 48B which extends the height of the stop block 46A and 46B. In this manner, a stop block bolt 50A and 50B may be extended through a respective slot 48A and 48B into a bolt-receiving hole 52 formed in each guide arm 22 and 44. The combination of a plurality of bolt-receiving holes 52 and the slot 48A and 48B in stop blocks 46A and 46B enables the stopping point of the subbase plate 100 to be adjusted to interrupt the cutting process in order to create a wider variety of designs.

Mounted on the underside of each guide arm 22 and 24 are a plurality of T-nuts 54, each having spiked extensions and a threaded bolt-receiving hole 56. The T-nuts 54 are aligned with the bolt-receiving holes 52 such that the stop block bolts 50A and 50B may extend through the slot 48A and 48B in each stop block 46A and 46B through the bolt-receiving holes 52 and be threadably secured in each T-nut 54. The spiked extensions of each T-nut 54 extend upwards into a respective guide arm 22 and 24 to secure the T-nut 54 in place.

Additionally, each of the guide arms 22 and 24 include downwardly projecting locating dowels 58 (shown most clearly in FIGS. 6 and 7), mounted on the underside of each guide arm 22 and 24. As shown most clearly in FIG. 7, each of the locating dowels 58 has a generally flattened cylindrical shape, preferably formed by using cylindrical dowels and cutting two sides of each dowel 58 to form generally parallel upright side faces 60A and 60B. When the guide arms 22 and 24 are in place on the spacing arms 16A and 16B, the locating dowels 58 extend between the underside of each guide arm 22 and 24 and the top surface of the base platform 12, thus enabling the channel sections 26A and 26B to be aligned substantially parallel with the edges of a work piece 106. As is most clearly shown in FIG. 7, the locating dowels 58 are aligned along a line parallel to the respective channel section 26A and 26B on the respective guide arm 22 and 24 on which the locating dowels 58 are mounted.

The mounting means for each of the guide arms 22 and 24 is shown most clearly in FIGS. 1 and 2 as including two pairs of generally diagonal slots 62A, 62B, 64A and 64B, one pair of slots on each of the guide arms 22 and 24. Bolts 66A, 66B, 68A and 68B extend through each of the slots 62A, 62B, 64A and 64B through holes (not shown) in each of the spacing arms 16A and 16B and into the base platform 12 which has a plurality of T-nuts (not shown) which threadably secure the bolts 66A, 66B, 66B and 68B. The diagonal attitude of the slots 62A, 62B, 64A and 64B allow for each guide arm 22 and 24 to be adjusted to align with the adjacent edge of a work piece 106. However, in a preferred embodiment, guide arms 22 and 24 may only adjust to accommodate corners of the work piece not more than 5° out of right angle.

It is important to note that the bolts 66A, 66B, 68A and 68B are positioned inwards of each tilt strip 20A and 20B such that when the bolts are tightened, a work piece 106 placed between the guide arms 22 and 24 and the base platform 12 may be clamped in position by the downward tilting action of inner portion of each guide arm 22 and 24.

Finally, the guide arms 22 and 24 are connected to each other by hinge section 70, most clearly shown in FIGS. 1 and 2. The hinge axis 72 is preferably positioned directly below the right-angle corner 38 between the channel sections 26A and 26B to allow for proper adjustment of the angle between the left and right guide arms 22 and 24. The hinge assembly 70 may be constructed of plastic or the like to provide a durable and sturdy hinge assembly.

It is preferred that each of the channel sections 26A and 26B have a length between 10 and 30 inches to provide a sufficient length for movement of the router guide plate 100 along the channel sections 26A and 26B. As it is the length of the channel sections 26A and 26B which helps determine the overall dimensions of the remaining elements of the auxiliary router guide 10, it is deemed unnecessary to include dimensional descriptions for the other elements of the invention.

FIGS. 8-12 exhibit a second preferred embodiment of the auxiliary router guide. The portable auxiliary router guide 110 is shown in its preferred embodiment in FIGS. 8-12 as including a generally V-shaped base platform 112 having left and right channel support arms 114 and 116 extending generally perpendicular to each other and a rearwardly projecting, generally rectangular adjustment bar support section 118.

The portable auxiliary router guide 110 includes many of the elements disclosed as included in the table top mounted auxiliary router guide 10. These include channel sections 120A and 120B, angled support strips 122A and 122B and stop blocks 124A and 124B including slots 126A and 126B and stop block bolts 128A and 128B, which extend through the slots 126A and 126B through holes formed in the base platform 112 and into a respective T-nut 130A and 130B, shown most clearly in FIG. 12. The channel sections 120A and 120B however, may be formed as an integral piece having a right angle bend or as the two separate channel sections, in which case it is preferred that the outer curved section 132 be formed by substantially equal arcuate extensions 134A and 134B which curve in order to meet at the center of the outer curved section 132, thus forming a substantially continuous outer curved section 132. Also, it is preferred that the channel sections 120A and 120B be bent inwards at their opposite ends as described previously in connection with channel sections 26A and 26B of the table top mounted auxiliary router guide 10.

As was previously described in connection with the table top mounted auxiliary router guide 10, a router 102 having a subbase plate 100 mounted thereon may be placed on the portable auxiliary router guide 110, the guide pins 104A and 104B of the router guide plate 100 fitting into the channel sections 120A and 120B. Dependent upon the placement of the guide pins 104A and 104B on the router guide plate 100, various designs or patterns 136 may be formed on a block of wood 138.

Figure 12:
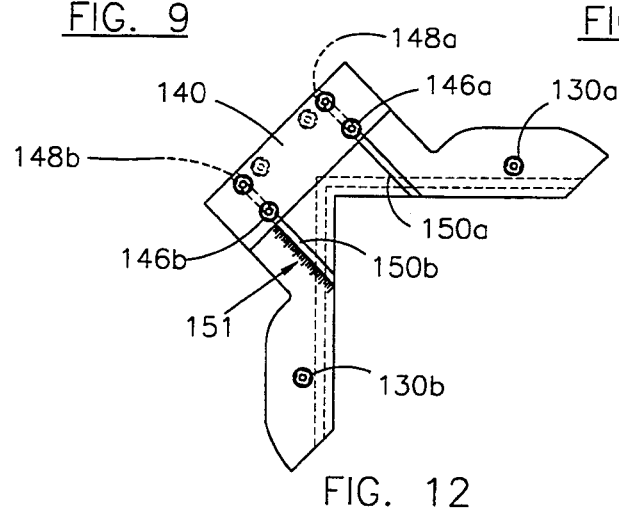
FIG. 12 is a bottom plan view of the portable auxiliary router guide.

The portable auxiliary router guide 110 further includes an alignment bar 140, shown most clearly in FIG. 12. The alignment bar 140 is preferably a rectangular block of wood or other such material which is slidably mounted to the underside of the alignment bar support section 118. A pair of generally parallel, spaced apart alignment slots 142A and 142B are formed in the alignment bar support section 118 extending between the top and bottom surfaces of the bar support section 118. A pair of alignment bar bolts 144A and 144B extend downwards through each alignment bar slot 142A and 142B through holes formed in the alignment bar 140, the alignment bar bolts 144A and 144B being secured in respective T-nuts 146A and 146B mounted on the underside of the alignment bar 140 and aligned with each hole in the alignment bar 140.

It is preferred that the length of each channel section 120A and 120B be between 6 and 15 inches, although it is only important that the channel sections 120A and 120B be long enough to properly inscribe designs 136 on a block of wood 138. As was explained above in connection with the table top mounted auxiliary router guide 110, the remaining dimensions of the portable auxiliary router guide 110 are derived from the length of the channel sections 120A and 120B, and therefore it is deemed unnecessary to include dimensional descriptions for the remaining elements of the portable auxiliary router guide 110.

It is preferred that the alignment bar 140 be constructed having a pair of parallel raised ridges 148A and 148B formed on the top surface of the alignment bar 140. To accommodate these raised ridges 148A and 148B, a pair of ridge-receiving grooves 150A and 150B would preferably be formed in the underside of the base platform 112 in the alignment bar support section 118, as best shown in FIG. 12. FIG. 12 shows that the ridge-receiving grooves 150A and 150B are formed substantially parallel to the alignment bar slot 142A and 142B. In this manner, the ridges 148A and 148B and ridge-receiving grooves 150A and 150B cooperate with the alignment bar slots 142A and 142B to keep the alignment bar 140 substantially perpendicular to each of the alignment bar slots 142A and 142B. This allows a block of wood 138 which is being worked on to be positioned depending upon location of the alignment bar 140 in relation to the channel sections 120A and 120B to form a pattern in the desired location. By adjusting the location of the alignment bar 140, the location of the pattern being formed on the wood is adjusted. As shown in FIG. 8, clamps 152A and 152B may be used to secure the portable router guide plate apparatus 110 to a block of wood 138. However, it is to be understood that a variety of clamping means may be used in addition to those shown.

For properly positioning the alignment bar 140 or for repeating the positioning of a particular design, a gradated scale 151 is printed on the underside of the rear alignment bar support 118, as shown in FIG. 12. This gradated scale 151 allows a user of the portable auxiliary router guide 110 to repeatedly cut designs into a workpiece at precisely the same distance from the workpiece edge, thus increasing the accuracy of the cutting process. This is done by moving the alignment bar 140 such that the forward edge of the bar is aligned with a selected line of the scale 151. The position of the alignment bar 140 may thus be repeated in the future by merely realigning the bar with the previously selected line on the gradated scale 151. In this manner, identically positioned designs may be cut into a workpiece.

The main difference between the portable auxiliary router guide 110 and the table top mounted auxiliary router guide 10 is that when the portable auxiliary router guide 110 is placed in a block of wood 138, the channel sections 120a and 120b are preferably positioned at 45° angles from the edge of the block of wood 138 against which the alignment bar 140 is positioned. On the other hand, on the table top mounted auxiliary router guide 10, each of the channel sections 26a and 26b is aligned generally parallel with an adjacent side of the work piece 106.

A limitation of the portable auxiliary router guide 110 is that the alignment bar 140 may only be moved rearwards to the extent of the length of alignment bar support section 118. As it would prove inefficient to permanently lengthen the alignment bar support section 118, there is a need occasionally for a slot extender 154, shown in FIGS. 13-16, to enable to the portable auxiliary router guide 110 to be positioned inwards of the edges of a block of wood 138.

The slot extender 154 includes a generally flat rectangular slotted section 156 having a height approximately the same as the base platform 112 of the portable auxiliary router guide 110. Extending from the top of the slotted section 156 is a slot extender connection bracket 158 mounted to the slotted section 156 by a plurality of wood screws 160. As most clearly shown in FIGS. 14 and 15, the connection bracket 158 extends forwardly of the front edge 162 of the slotted section 156 such that the connection bracket 158 may project over the alignment bar support section 118 of the base platform 112 of the portable auxiliary router guide 110 and be secured thereto.

Figures 14, 15, 16:
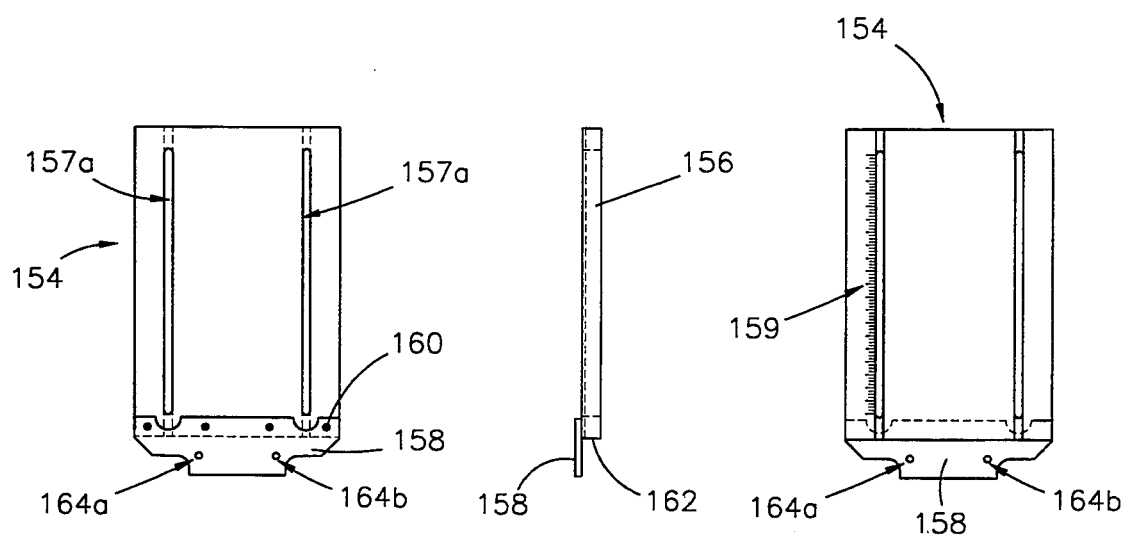
FIG. 14 is a top plan view of the extension piece by itself.
FIG. 15 is a side elevational view of the extension piece.
FIG. 16 is a bottom plan view of the extension piece.

As was described previously in connection with the portable auxiliary router guide 110, the slot extender 154 also includes a gradated scale 159, as shown in FIG. 16, printed on the bottom face of the slot extender 154. This gradated scale 159 performs the same function as was described in connection with gradated scale 151, but may be used when the slot extender 154 is attached to the portable auxiliary router guide 110.

FIGS. 8 and 12 show that the alignment bar support section 118 includes a pair of connection holes 164A and 164B and corresponding T-nuts 166A and 166B mounted on the underside of the alignment bar support section 118. As shown most clearly in FIG. 14, the connection bracket 158 also includes a pair of bolt holes 168A and 168B, which, when placed over the connection holes 164A and 164B and aligned therewith, cooperate to receive a pair of connection bolts 170A and 170B which extend downwards through the bolt holes 168A and 168B through the connection holes 164A and 164B and are threadably secured in the T-nuts 166A and 166B, as shown in FIG. 13. FIGS. 13, 14 and 16 also show that the connection bracket 158 includes arcuate removed sections provided to enable the alignment bar bolts 144A and 144B of the alignment bar 140 to freely move along any of the alignment bar slots 142A and 142B or extension slots 157A and 157B as shown in FIG. 13.

Also, similar to the techniques shown in FIG. 8, clamps 152A and 152B may be used to secure the slot extender 154 above a block of wood 138, such that a stable router guide is provided. It is therefore understood that a variety of clamping devices may be used.

Figure 17:
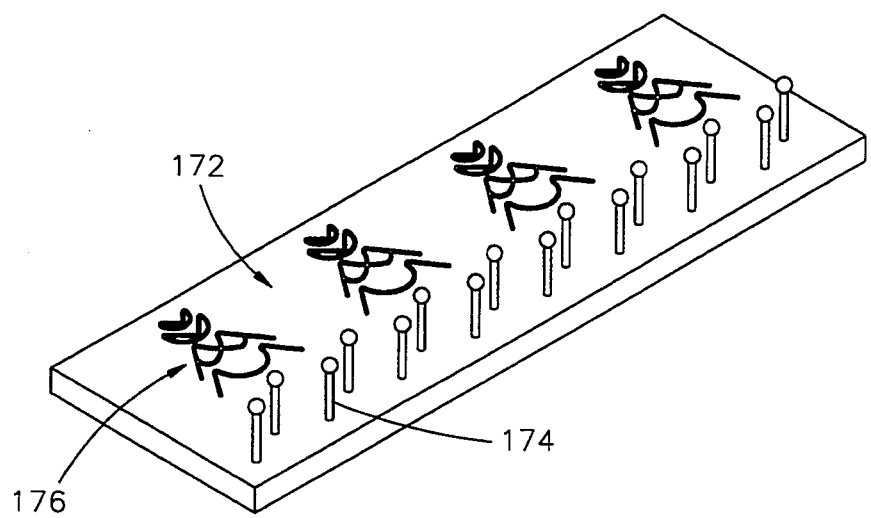
FIG. 17 is a perspective view of a finished manufactured product.

FIG. 17 shows what a finished product may look like following use of the portable auxiliary router guide 110. FIG. 17 shows a tie rack 172 having a plurality of tie support pegs 174 and various formed designs 176 cut into the tie rack 172. It can be seen that each set of designs 176 includes four separate design patterns, which are formed as shown in FIG. 8 by adjusting the guide pins 104A and 104B on the router guide plate 100 and repositioning the portable auxiliary router guide 110 by adjusting the position of the alignment bar 140 relative to the channel sections 120A and 120B. The finished result is thus shown.

FIGS. 18-21 exhibit the pen holder design generator of the present invention. The pen holder design generator 210 is shown as being mounted on a router guide plate 212 which includes a plurality of holes 214 for retaining guide pins 216A and 216B and a spacing cylinder 217, the plate being substantially as shown and described in Kieffer, U.S. Pat. No. 4,294,297.

Figure 18:
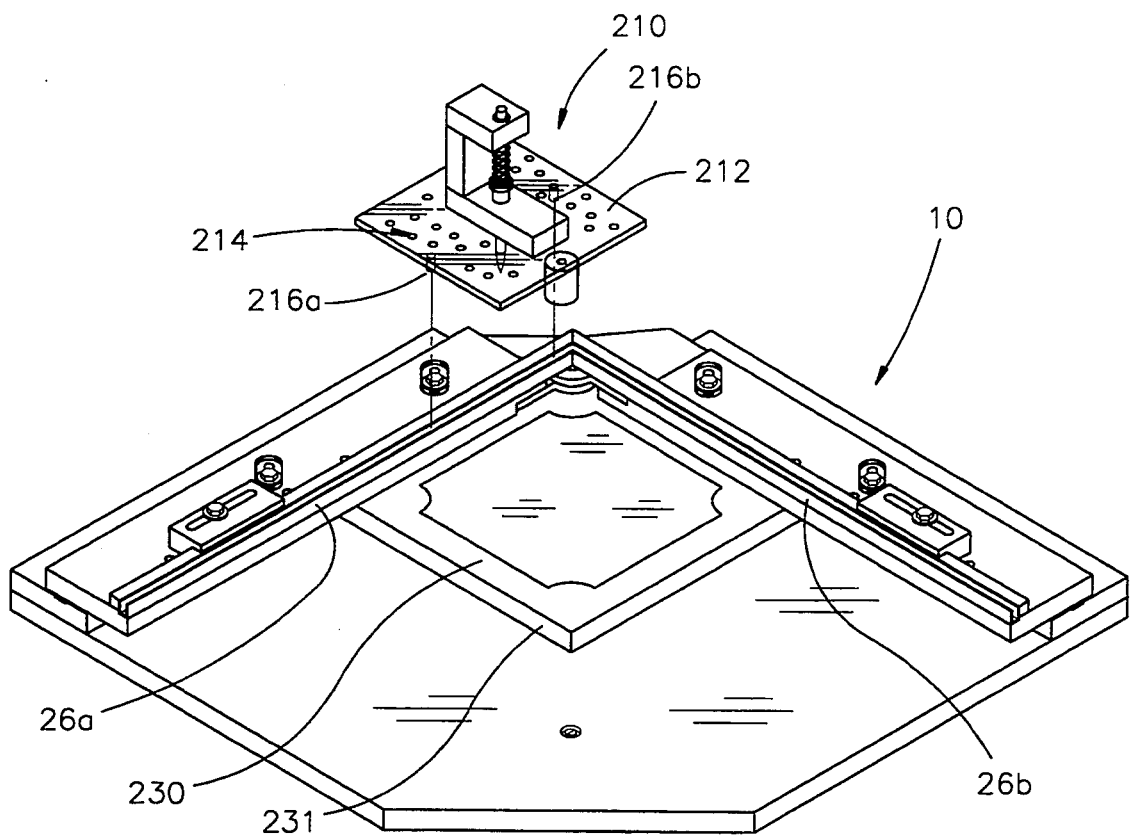
FIG. 18 is a perspective view of the pen holder design generator mounted on the portable auxiliary router guide; the portable auxiliary router guide having a piece of paper mounted thereon on which the pen holder design generator is generating a design.
Figure 19:
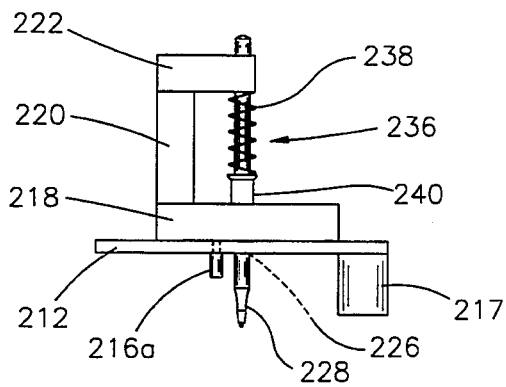
FIG. 19 is a side elevational view of the pen holder design generator.
Figure 20:
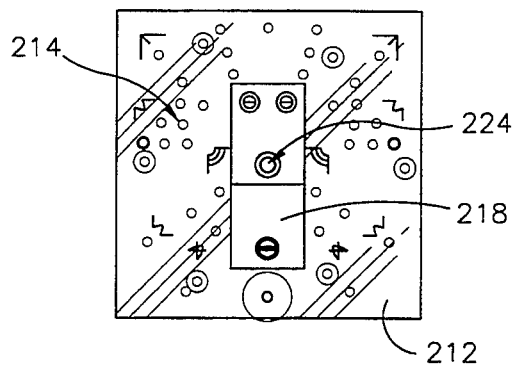
FIG. 20 is a top plan view of the pen holder design generator.

The pen holder design generator 210 includes a generally rectangular base block 218 mounted on the top surface of the router guide plate 212 substantially as shown in FIGS. 18 and 19. Mounted on the rear section of the top surface of the base block 218 and extending upwards therefrom is a vertical support block 220 which may be connected to the base block 218 by glue or wood screws. Mounted atop the vertical support block 220 and extending forward therefrom is a spring tensioning block 222 having a pen-receiving hole 224 formed therein extending substantially vertically the height of the spring tensioning block 222. A similar hole 226 is formed in the base block 218 to allow a pen 228 to project through the pen-receiving hole 224 in the spring tensioning block 222 through the hole 226 in the base block 218 and downwards to the paper 230 or work piece 232 on which a design 234 is being drawn. FIG. 18 presently shows the paper 230 mounted on a block of wood 231 to raise the paper 230 up to the desired height, which is approximately ¾".

Figure 21:
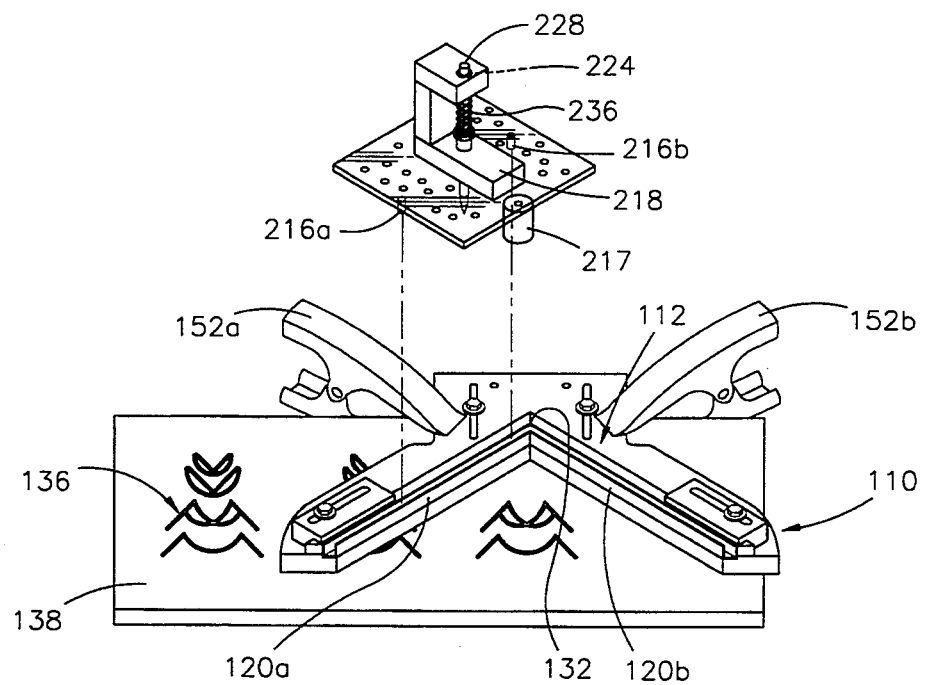
FIG. 21 is a perspective view of a piece of wood having a design drawn on it by the pen holder design generator.

For keeping the pen 228 in contact with the paper 230, a spring tension device 236 is provided, as shown in FIG. 19. The spring tensioning device 236 includes a spring 238 which extends upwards from and is connected to a pen collar 240 which is adapted to frictionally engage the sides of a pen 228 thus enabling a pen to be removed and replaced when a different color is desired or when the pen runs out of ink without requiring disassembly of the pen holding design generator 210. The spring 238 presses against the underside of the spring tensioning block 222 to force the pen 228 into contact with the paper 230 or work piece 232 on which a design 234 is being drawn, as shown in FIGS. 18 and 21.

A pen holder design generator 210 provides a technique for viewing designs before they are carved into a work piece, thus providing the inventive craftsperson a method by which to invent new and original design combinations.

Figure 22:
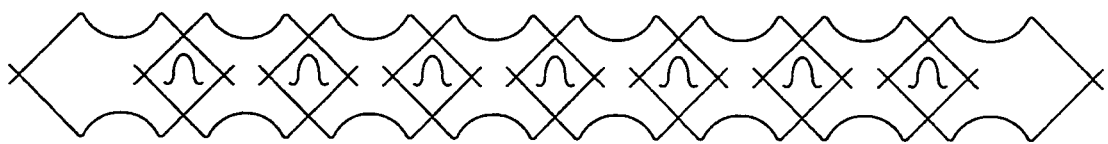
FIG. 22 is a top plan view of sample design formed by using the pen holder design generator.

FIG. 22 exhibits a sample design produced by the pen holder design generator 210. Of course, many alternative designs may be produced by the pen holder design generator 210 of which the example in FIG. 22 is only a sample.

The method of the present invention contemplates providing a router 102 having a rotatable bit (not shown), a work piece 106 having a work face on the upper surface thereof, the router 102 including a router guide plate 100 mounted on the under side of the router 102, the router guide plate 100 including a pair of guide pins 104A and 104B removably secured to the router guide plate 100 and extending downwards therefrom. The router guide plate 100 also includes a tool opening (not shown) which allows the router bit (not shown) to project through the tool opening.

Also provided is a base platform 112 having top and bottom surfaces, and a guide pin receiving channel having a corner 132 and at least two channel sections 120A and 120B, the corner 132 being formed between the channel sections 120A and 120B. The channel sections 120A and 120B are mounted on the top surface of the base platform 112, the channel sections 120A and 120B being adapted to receive and guide the guide pins 104A and 104B on the router guide plate 100. An alignment bar 140 is adjustably mounted to the bottom surface of the base platform 112 for aligning the work piece 138 relative to the channel sections 120A and 120B.

The base platform is then positioned adjacent the work face of the work piece 138 such that the bottom surface of the base platform 112 is at least partially overlaying the upper surface of the work piece 138. The alignment bar 140 is then adjusted to position the work piece 138 relative to the channel sections 120A and 120B such that the desired section of the work face may be properly routed.

The guide pins 104A and 104B of the router guide plate 100 are then inserted into one of the channel sections 120A, as shown in FIG. 8. The router bit is then moved into working engagement with the work face of the work piece 138, at which time a routed line may be cut into the work face of the work piece 138 by maintaining the guide pins 104A and 104B in the guide pin receiving channel section 120A while simultaneously advancing the guide pins 104A and 104B along the guide pin receiving channel section 120A.

The step of advancing the guide pins along the channel section further includes advancing the guide pins 104A and 104B along the first section 120A of the guide pin receiving channel until the first guide pin 104B engages the corner curved section 132. The first guide pin 104B is then advanced around the corner 132 onto the second channel section 120B while simultaneously the other guide pin 104A is advanced along the first section 120A of the channel to the point of engagement with the curved section 132, thereby cutting an arcuate routed line in the work piece 138. Finally, both guide pins 104A and 104B are advanced along the second section 120B of the channel. Using this method, then, a routed line may be formed in the work face of a work piece.

It is important to understand that one of the main purposes of the invention is to cut continuous designs around the periphery of a workpiece, a situation in which the stop blocks 46a, 46b, 124a and 124b are used only for preventing the router guide plate 100 from advancing past the end of a channel section 26a, 26b, 120a and 120b. An example of such a continuous design is shown in FIG. 1.

As can be seen from the above description, the present invention provides a substantial improvement over those router guide devices found in the prior art. The guide pin receiving channel in combination with the guide pins on the router guide plate allows for accurate mistake-free cutting of lines into work pieces. Additionally, use of the pen holder design generator allows a craftsman to view his design on paper or on the work piece before cutting the design into the work piece. The pen holder design generator may also be used to merely draw designs on a work piece which are then covered by polyethylene or another clear wood sealant to seal the design in place, thus forming an aesthetically pleasing design while preventing defacing of the wood surface.

Whereas the invention has been shown and described with preferred embodiments thereof, it is apparent that many modifications, substitutions and additions may be made which are within the intended broad scope of the claims. For example, the length, width, thickness and shape of the various elements of the invention may be varied as desired for a particular application. Likewise, construction materials may be varied as desired.

Thus there has been shown and described an apparatus and method for guiding a router along a work piece which accomplishes at least all of the stated objectives.

I claim:

1. An auxiliary router guide for use with a router guide plate adapted to be secured to the underside of a router, the router having a rotatable bit protruding from the underside thereof, the guide plate including at least two guide pins removably mounted on the guide plate and extending downwards therefrom and a tool opening, the tool opening positioned for protrusion of the bit through the center of the tool opening; said auxiliary router guide comprising;
   a base platform having top and bottom surfaces;
   a guide pin receiving channel mounted on said top surface of said base platform, said channel adapted to receive and guide the guide pins on the router guide plate;
   alignment means adjustably and removably mounted on said bottom surface of said base platform, said alignment means operative to align a piece of wood to be routed relative to said guide pin receiving channel.

2. The auxiliary router guide of claim 1 wherein said base platform further comprises forward and rearward sections, said guide pin receiving channel being mounted on said forward section of said base platform.

3. The auxiliary router guide of claim 2 wherein said forward section of said base platform comprises first and second guide arms extending outward, said guide arms extending generally perpendicular to one another.

4. The auxiliary router guide of claim 3 wherein said guide pin receiving channel comprises two channel sections, each having a base wall and side walls, one channel section aligned generally parallel with each of said guide arms such that said guide pin receiving channel includes a generally right-angle corner.

5. The auxiliary router guide of claim 4 further comprising at least one angled support strip mounted on said base platform adjacent said guide pin receiving channel, said angled support strip extending upwards above said side walls of said channel sections such that a router guide plate may be supported by and rest upon said support strip.

6. The auxiliary router guide of claim 2 wherein said rearward section of said base platform further comprises at least two generally parallel slots formed in said rearward section, said slots extending between said top and bottom surfaces.

7. The auxiliary router guide of claim 6 further comprising an alignment bar and at least two alignment bolts, said alignment bar adjustably mounted to said bottom surface, said alignment bolts extending through said slots in said rearward section and being secured in said alignment bar such that said alignment bar is adjustably mounted generally perpendicular to said slots, said alignment bar operative to align a piece of wood to be routed relative to said guide pin receiving channel.

8. The auxiliary router guide of claim 2 further comprising stop means, said stop means including at least two stop blocks adjustably mounted on said top surface of said base platform adjacent said guide pin receiving channel, said stop blocks adapted to prevent advance of a router guide plate.

9. In combination,
a router guide plate adapted to be secured to the underside of a router, said router having a rotatable bit protruding from the underside thereof, said guide plate including at least two guide pins removably mounted on said guide plate and extending downwards therefrom and a tool opening, said tool opening positioned for protrusion of said bit through the center of said tool opening;
a plate guide apparatus comprising;
a base platform; and
a guide pin receiving channel mounted on said base platform, said channel adapted to receive and guide said guide pins on said router guide plate;

10. The combination of claim 9 wherein said router guide plate further comprises a pen holder design generator comprising;
pen support means mounted on said router guide plate adapted to adjustably support a pen held therein;
said pen support means mounted above said tool opening such that a pen may extend downwards from said pen support means through said tool opening to contact material supported by said base platform.

11. The combination of claim 10 wherein said pen support means further comprises a base block, a generally upright support block extending upwards from and mounted on said base block, a spring tensioning block extending outwards from and mounted on said upright strut, said spring tensioning block extending over said tool opening, said spring tensioning block further including a generally upright hole adapted to slidably accept a pen therein such that a pen is inserted through said hole and through said tool opening and adjustably supported thereby, and a spring tensioning means, connected to a pen, operative to downwards bias a pen to contact a drawing surface, said spring tensioning means biased against said spring tensioning block.

12. A table mounted auxiliary router guide for use with a router guide plate adapted to be secured to the underside of a router, the router having a rotatable bit protruding from the underside thereof, the guide plate including at least two guide pins removably mounted on the guide plate and extending downwards therefrom and a tool opening, the tool opening positioned for protrusion of said bit through the center of the tool opening, said table mounted auxiliary router guide comprising;
a generally flat base platform having a top surface;
first and second guide arms mounted on said top surface of said base platform, at least one of said guide arms being adjustably and removably mounted;
said first guide arm including a first guide pin receiving channel section, said second guide arm including a second guide pin receiving channel section, each of said channel sections having a generally U-shaped cross-section;
said first and second guide pin receiving channel sections adapted to interfit at adjacent ends to form a substantially continuous guide pin receiving channel; and
said guide arms adapted to extend over at least a portion of a block of wood to be routed, said guide arms and said base platform cooperating to releasably secure a block of wood therebetween.

13. The table mounted auxiliary router guide of claim 12 wherein said base platform is mounted on a table for increased stability.

14. The table mounted auxiliary router guide of claim 12 wherein said first and second guide arms each further comprise top and bottom surfaces, said guide pin receiving channels being mounted on said top surface.

15. The table mounted auxiliary router guide of claim 14 further comprising at least two spacing arms mounted on said top surface of said base platform, said guide arms adjustably mounted on said spacing arms, one spacing arm at least partially underlying each guide arm, said guide arms mounted such that a work piece-receiving space is formed between said base platform and said guide arms.

16. The table mounted auxiliary router guide of claim 15 wherein said spacing arms each further comprise a pivot strip mounted on said spacing arms interspaced between said guide arms and said spacing arms and securement means for adjustably mounting said guide arms on said spacing arms, said securement means and said pivot strip operative to allow said guide arms to pivot to secure a block of wood between said guide arms and said base platform.

17. The table mounted auxiliary router guide of claim 15 where said guide arms further comprise a plurality of downwardly extending locating dowels mounted on and extending from said bottom surfaces of said guide arms, said locating dowels on each arm mounted generally parallel to one another, said dowels on said first arm arranged along a line generally parallel to said first guide pin receiving channel section, said dowels on said second arm arranged along a line generally parallel to said second guide pin receiving channel section, said locating dowels having a height less than the height of said work piece-receiving space.

18. A method for guiding a router having a rotatable bit along a workpiece having a work face on the upper surface thereof, the router including a router guide plate mounted on the underside of the router, the router guide plate including a pair of guide pins removably secured to the router guide plate and extending downwards therefrom and a tool opening, the tool opening positioned for protrusion of the router bit through the center of the tool opening, said method comprising the steps;
providing a base platform having top and bottom surfaces, a guide pin receiving channel having at least one corner and at least two channel sections, said corner formed between said sections, said channel mounted on the top surface of the base platform, the channel being adapted to receive and guide the guide pins on the router guide plate and alignment means mounted on said bottom surface of said base platform for aligning a work piece relative to said channel;
positioning said base platform adjacent the work face of workpiece such that said bottom surface of said base platform is at least partially overlaying the upper surface of a work piece;

adjusting said alignment means to position a work piece relative to said guide pin receiving channel such that the work face may be routed;

inserting the guide pins of the router guide plate into said guide pin receiving channel;

moving the bit of the router into working engagement with the work face of a work piece; and cutting a routed line in the work face of a workpiece by maintaining the guide pins in said guide pin receiving channel while simultaneously advancing the guide pins along said guide pin receiving channel;

said step of advancing the guide pins along said channel further including, advancing the guide pins along a first section of said channel until a first guide pin engages one of said corners;

advancing the first guide pin along a second section of said channel connected to said first section of said channel at said corner, while simultaneously advancing the other guide pin along said first section of said channel to the point of engagement with said corner thereby cutting an arcuate routed line in a work piece, and advancing both guide pins along said second section of said channel.

* * * * *